United States Patent

Hiraiwa et al.

[19]

[11] Patent Number: 4,791,951

[45] Date of Patent: Dec. 20, 1988

[54] GOVERNOR FOR HYDRAULICALLY CONTROLLED AUTOMATIC TRANSMISSION

[75] Inventors: Kazuyoshi Hiraiwa, Hamamatsu; Yoshiaki Shimizu, Hamakita; Koichi Hayasaki, Fujisawa, all of Japan

[73] Assignee: Rhythm Motor Parts M.F.G. Co., Ltd., Shizuoka, Japan

[21] Appl. No.: 92,379

[22] Filed: Sep. 2, 1987

[30] Foreign Application Priority Data

Sep. 3, 1986 [JP] Japan ................ 61-207299

[51] Int. Cl.$^4$ ........................... G05D 13/38
[52] U.S. Cl. ........................... 137/56
[58] Field of Search ................ 137/53, 56

[56] References Cited

U.S. PATENT DOCUMENTS

| 2,762,384 | 9/1956 | Rosenberger | 137/56 |
| 3,431,929 | 3/1969 | Croswhite | 137/56 |
| 3,683,950 | 8/1972 | Yamada | 137/56 |
| 3,906,975 | 9/1975 | Craig | 137/56 |
| 4,323,093 | 4/1982 | Whitney | 137/56 |

*Primary Examiner*—Robert G. Nilson
*Attorney, Agent, or Firm*—Wenderoth, Lind & Ponack

[57] ABSTRACT

The output rotation of an automatic transmission is transferred to a flyweight to rotate it. A spool is depressed in an axial direction under the centrifugal force of the flyweight, generating a governor hydraulic pressure corresponding to the rotational speed of the flyweight. Some of the governor pressure is fed back to the spool. The force in the direction opposite to the pressing force generated by the flyweight is applied to the spool, thereby balancing the spool. A spring enclosing chamber communicating with the outside is formed serially in the axial direction of the spool and separately from the feedback hydraulic pressure. A force in the direction opposite to the pressing force of the flyweight is exerted on the spool by the spring disposed in the spring enclosing chamber, thereby establishing a breakpoint at which generation of the governor hydraulic pressure occurs.

7 Claims, 6 Drawing Sheets

GOVERNOR FOR HYDRAULICALLY CONTROLLED AUTOMATIC TRANSMISSION

BACKGROUND OF THE INVENTION

The present invention relates to a governor for generating a governor pressure adapted to switch a shift valve of an automatic transmission by the rotation of a flyweight and, more particularly, to a governor in which no governor pressure is generated until a governor rotational speed increases to a predetermined breakpoint speed, and when the governor speed has reached the breakpoint, the governor pressure is raised in a stepwise manner in which, the governor pressure increases in accordance with the governor speed.

Hitherto, as such a governor, the governor disclosed in U.S. Pat. No. 2,762,384 has been known.

The governor disclosed in U.S. Pat. No. 2,762,384 has a sleeve engaged with the gear of an output rotation transfer portion of an automatic transmission, and a spool, which is slidable in the axial direction, is provided in the sleeve. A pair of flyweights which generate centrifugal forces during the rotation of the sleeve and are exposed to the outside are attached on the end opposite to the end formed with a gear. When the sleeve rotates, the flyweights swing in a manner in which they are swung outwardly from a pin serving as a rotational center and in dependence on the centrifugal force, thereby depressing the spool. When the spool is depressed, an opening degree of the valve portion, which places the entrance port and exit port formed in the sleeve in communication, increases. Since a constant line hydraulic pressure is supplied from the oil pump to the entrance port, the governor hydraulic pressure corresponding to the opening degree of the valve due to the depression of the spool is generated in the exit port, so that the governor hydraulic pressure rises with an increase in governor speed.

In the conventional governor, the governor pressure is generated simultaneously with the start of the rotation of the sleeve and thereafter, the governor pressure is also sequentially increased in association with an increase in sleeve speed. However some vehicles require that the switching operation of the shift valve can be inhibited until the vehicle velocity reaches a predetermined speed. For this purpose, it is necessary that no governor pressure is generated until the sleeve speed reaches a predetermined speed, namely, a breakpoint.

A known governor having breakpoint, a is disclosed in U.S. Pat. No. 3,431,929.

In U.S. Pat. No. 3,431,929, a spring is disposed between a pair of flyweights which are slidably attached by a pin, the spring adapted to suppress the extension of the flyweights due to the centrifugal forces and attached to the edge of the sleeve.

Therefore, the motion of the flyweights is restricted by the spring until the sleeve speed reaches a rotational speed corresponds to the breakpoint. When the sleeve speed reaches the breakpoint, the centrifugal forces of the flyweights overcome the spring force and press and bend it in a snap action manner. Thus, the ends of the flyweights come into contact with the edge of the spool to thereby start depressing the sleeve. At this time, the governor pressure increases in a stepwise manner.

However, in the foregoing governor having a breakpoint, there is a difference between the breakpoint when the sleeve speed was raised and the breakpoint when it was lowered after that, so that there is a problem in that the breakpoint cannot be accurately set.

In addition, since the spring for establishing a breakpoint is provided for the flyweights, the spring force exerts an influence on the generation of the governor pressure corresponding to the rotational speed after the breakpoint is exceeded. Therefore, there is a problem in that the foregoing governor cannot be used at a very high rotational speed.

SUMMARY OF THE INVENTION

It is an object of the invention to provide a governor which does not generate a governor pressure until a sleeve speed reaches a predetermined rotational speed in order to inhibit the switching operation of a shift valve with certainity until a velocity of a vehicle reaches a predetermined speed.

Another object of the invention is to provide a governor in which the breakpoint when the sleeve speed is increased is consistent with the breakpoint when the sleeve speed is decreased.

Still another object of the invention is to provide a governor in which a spool which is depressed by the centrifugal forces of flyweights is biased in the opposite direction by a spring, thereby enabling a breakpoint to be set.

Still another object of the invention is to provide a governor in which a governor hydraulic pressure generated in the end portion of a spool is fed back, thereby balancing the spool.

Still another object of the invention is to provide a governor in which a plunger which is pressed by a spring is provided next to a spool, whereby a governor pressure is allowed to be fed back between the plunger and the spool.

Still another object of the invention is to provide a governor in which a plunger is provided in the end portion of a spool between which a spring is disposed, thereby allowing a governor pressure to be fed back to the end portion of the plunger.

Namely, in the invention, the output rotation of the automatic transmission is transferred to the sleeve via the gear and the flyweights provided at the edge of the sleeve are swung outwardly by the centrifugal forces. The spool constituting the switching valve mechanism is disposed in the spool hole of the sleeve so as to be slidable in the axial direction. The spool in accordance with the centrifugal rotational forces imparted to the flyweights, is depressed. When the spool is depressed, the pressure adjusting chamber between the lands formed on the spool is open to the entrance port formed in the sleeve. The governor hydraulic pressure corresponding to the rotational speed is generated in the exit port. A partial pressure of the governor hydraulic pressure generated in the exit port is fed back to the spool and the force against the pressing forces of the flyweights is directly or indirectly applied to the spool, so that the spool is balanced.

A plunger is provided next to the end portion of the spool and is directly or indirectly subjected to the feedback governor hydraulic pressure. A spring enclosing chamber separated from the feedback hydraulic pressure chamber of the governor hydraulic pressure is formed serially in the axial direction of the spool by the plunger. A spring adapted to depress the spool against the flyweights and to establish a predetermined breakpoint is disposed in the spring enclosing chamber. The spring enclosing chamber communicates with the outside through a vent hole.

The above and other objects, features, and advantages of the present invention will become more apparent from the following detailed description in conjunction with the accompanying drawings.

BRIEF DESCRIPTION OF PREFERRED EMBODIMENTS

Figure 1:
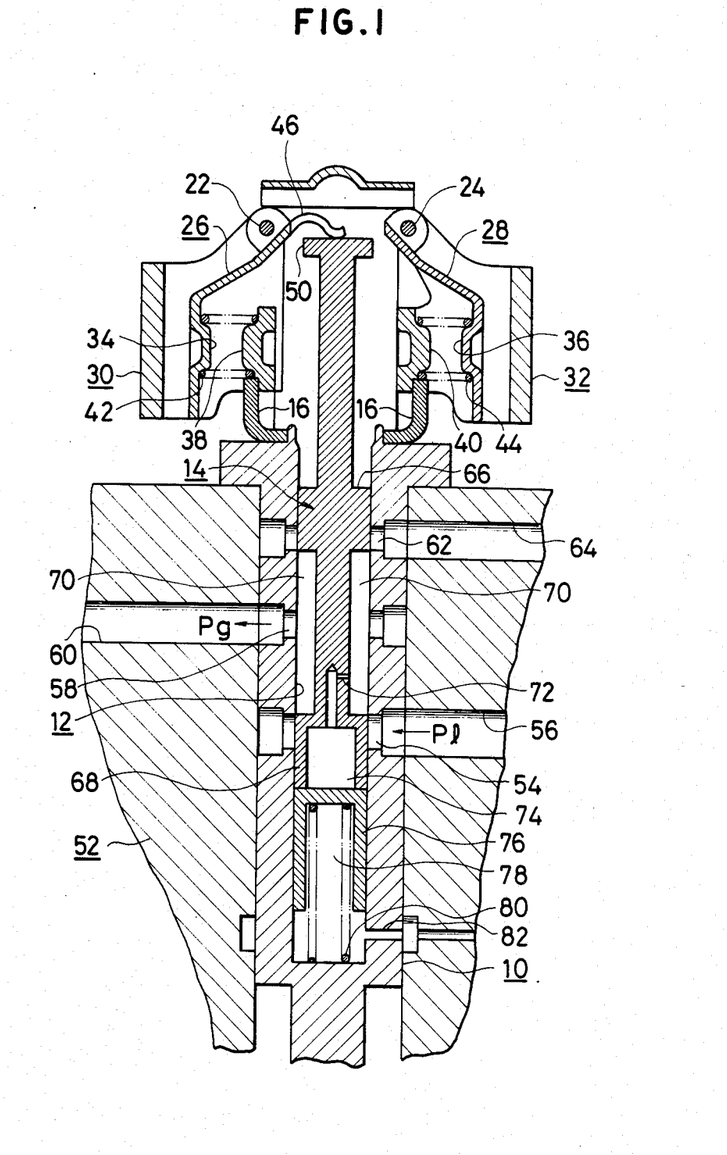
FIG. 1 is a cross sectional view showing a first embodiment of the present invention.

FIG. 1 is a cross sectional view showing the first embodiment of the present invention.

In FIG. 1, reference numeral 10 denotes a sleeve serving as a governor main unit. A spool hole 12 which is open at one end extends in the sleeve 10 in an axial direction thereof. A spool 14 is slidably assembled into the spool hole 12 of the sleeve 10. A gear (not shown) is formed in the outer peripheral portion at the lower end portion of the sleeve 10 and engages a gear formed in an output rotation transfer portion of an automatic transmission. The sleeve 10 is rotated in accordance with the vehicle velocity corresponding to the output rotation of the automatic transmission, i.e., the rotational speed of the wheels.

FIG. 1 illustrates a state in which the sleeve 10 is in the maximum speed range.

Figure 2:
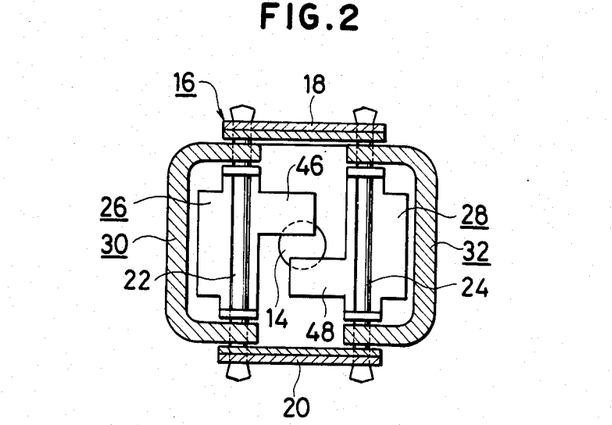
FIG. 2 is a plan view of FIG. 1.

A box-shaped support 16 which is open to the right and left is fixed to the upper portion of the sleeve 10. As shown in a plan view of FIG. 2, a pair of governor pins 22 and 24 are inserted between opposite supporting members 18 and 20 comprising support 16, and both ends are crushed by caulking or the like, thereby preventing the support 16 from being pulled out. Secondary weights 26 and 28 and primary weights 30 and 32 are axially supported at one end by the governor pins 22 and 24, respectively. The weights of each pair of secondary weights 26 and each pair of 28 and primary weights 30 and 32 are mutually balanced at the same time, these primary and secondary weights are attached so as to freely swing around the governor pins 22 and 24 serving as the rotational axes thereof. Compressing springs 42 and 44 for setting loads are attached between retainer portions 34 and 36 which are formed integrally with the secondary weights 26 and 28 and retainer portions 38 and 40 which are formed integrally with the primary weights 30 and 32, respectively. The primary weights 26 and 28 and the secondary weights 30 and 32 are coupled via the springs 42 and 44 in accordance with the centrifugal forces which are generated due to the rotation of the sleeve 10, respectively. These weights swing so as to be extended outwardly around the governor pins 22 and 24. A head top portion 50 of the spool 14 is downwardly depressed by ends 46 and 48 of the secondary weights 26 and 28.

Referring again to FIG. 1, the sleeve 10 is rotatably fitted into a casing 52 of the automatic transmission. An entrance port 54 is formed in the sleeve 10. A predetermined line hydraulic pressure $P_l$ is applied from an oil pump to the entrance port 54 through a passageway 56 of the casing 52. An exit port 58 is also formed in the sleeve 10. A governor hydraulic pressure $P_g$ is supplied from the exit port 58 to a shift valve mechanism of the automatic transmission through a passageway 60 of the casing 52. Furthermore, a drain port 62 is formed in the sleeve 10. The drain port 62 communicates with a tank of the oil pump through a passageway 64 of the casing 52.

When the spool 14 is slid downwardly by the rotation of the primary weights 30 and 32 and secondary weights 26 and 28, the entrance port 56 communicates with a pressure adjusting chamber 70 which is defined between lands 66 and 68 partitioning the spool 14. Hydraulic pressure corresponding to the degree at which the entrance port 54 is open to the pressure adjusting chamber 70 is generated as the governor hydraulic pressure $P_g$ in the exit port 58.

The pressure adjusting chamber 70 of the spool 14 communicates with a feedback hydraulic pressure chamber 74 formed in the lower portion of the spool 14 through an orifice 72. The governor hydraulic pressure $P_g$ which was fed into the chamber 74 generates a force which urges the spool 14 upwardly, thereby suppressing the rapid motion of the spool 14 when the entrance port 54 is opened to the pressure adjusting chamber 70 and balancing the spool.

A mechanism for establishing a predetermined breakpoint is provided below the spool 14.

Practically speaking, a plunger 76 is slidably assembled into the spool hole 12 under the spool 14. A spring enclosing chamber 78 is formed between the plunger 76 and the bottom of the spool hole 12. A compressing spring 80 for applying a preload is attached to the spring enclosing chamber 78. The spring 80 forces the spool 14 upwardly against the downward pressing forces of the flyweights (the secondary weights 26 and 28 and the primary weights 30 and 32) and establishes a breakpoint before which the generation of the governor pressure is inhibited until the vehicle velocity reaches a predetermined velocity. The spring enclosing chamber 78 communicates with the outside via a vent hole 82, thereby allowing air to be led into or exhausted from the chamber 78 in association with the expansion or contraction of the spring 80.

The operation of the present invention will now be described.

Figure 3:
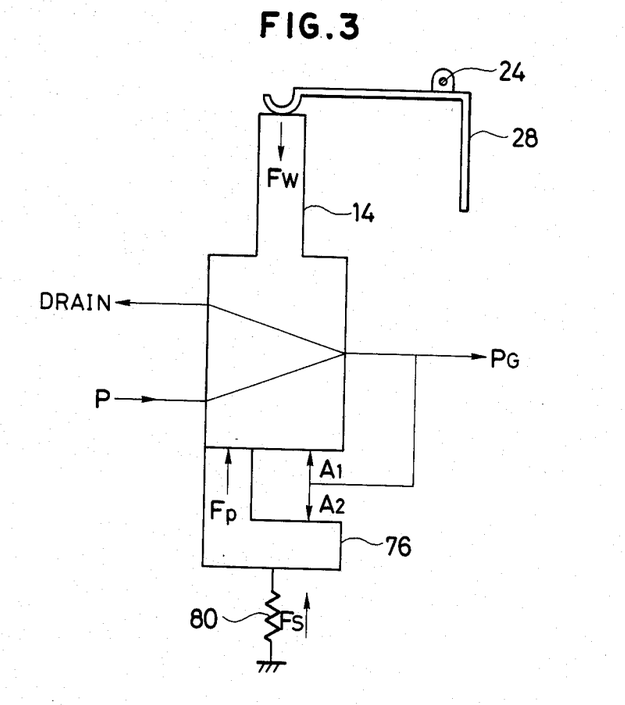
FIG. 3 is an explanatory diagram schematically illustrating the operation of the embodiment of FIG. 1.
Figure 4A:
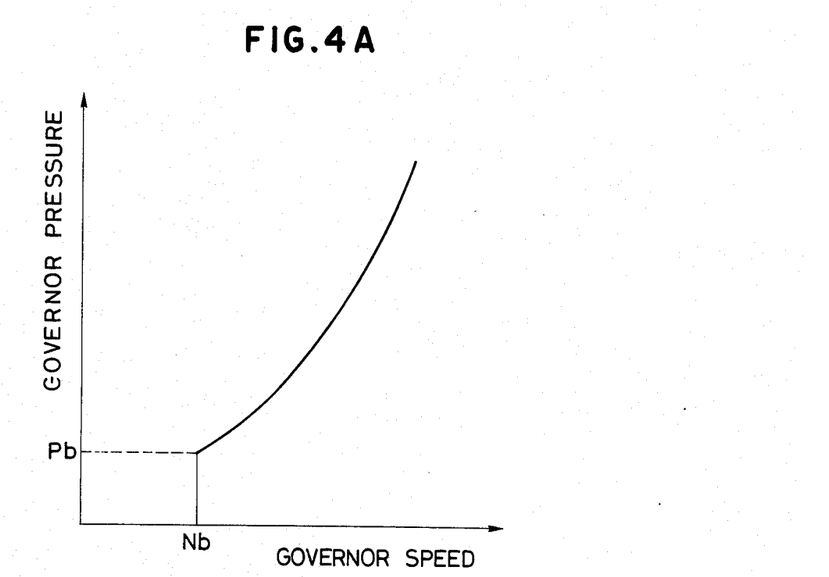
FIG. 4A is a graph showing the relationship of governor pressure to governor speed established by the embodiment shown in FIG. 1.
Figure 4B:
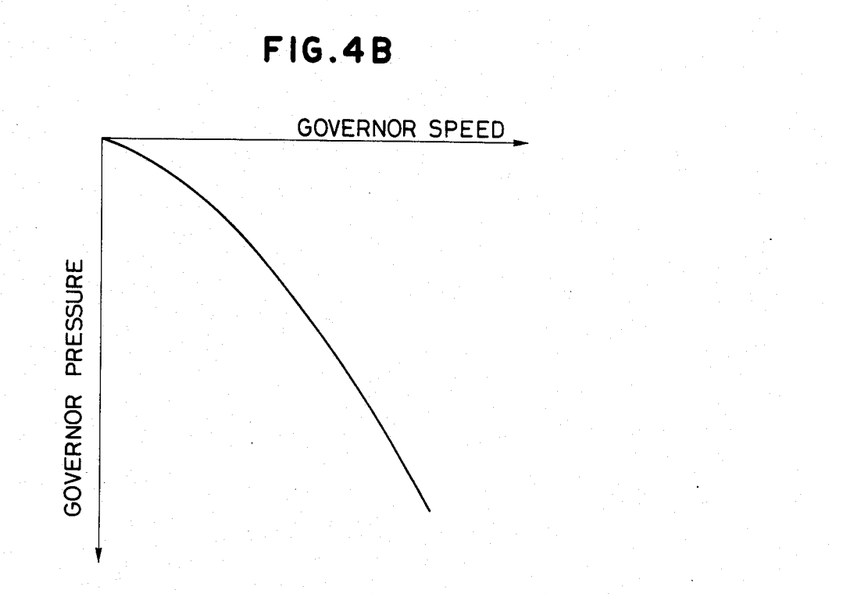
FIG. 4B is a graph showing the relationship of governor pressure to governor speed established in a conventional governor having no breakpoint.

FIG. 3 is an explanatory diagram schematically illustrating the operation of the embodiment shown in FIG. 1. FIG. 4A is a graph of the generation of the governor pressure to the governor rotational speed (hereinafter, also referred to as a governor speed) in the embodiment of FIG. 1. FIG. 4B is a graph of characteristics of a conventional governor having no breakpoint.

First, the operation in which the vehicle velocity is below a predetermined velocity, namely, a governor speed N is smaller than a breakpoint $N_b$, will be explained.

As shown in FIG. 3, since the spring 80 is attached in the spring enclosing chamber 78, the plunger 76 is forced upwardly by a force $F_s$. The following relationship exists between the pressing force $F_s$ generated by the spring 80 and a downward (in the diagram) pressing force $F_w$ exerted on the governor spool 14 by the flyweights which are represented in the figure by the secondary weight 28.

$$F_s > F_w \qquad (1)$$

As shown in the inequality (1), since the pressing force $F_s$ is set to be larger than the downward pressing force $F_w$ generated during the governor rotation prior to the breakpoint (sleeve rotation), the downward sliding motion of the spool 14 is prevented. Thus, the communication between the entrance port 54 and the pressure adjusting chamber 70 is closed and the governor pressure $P_g$ is $$P_g = 0 \qquad (2)$$

The operation when the vehicle velocity increases and the governor speed N reaches a speed above the breakpoint $N_b$, namely, the operation when $$F_w \geq F_s \qquad (3)$$

will now be described.

When the downward pressing force $F_w$ generated by the flyweights reaches a value greater than the upward pressing force $F_s$ generated by the spring 80 in association with an increase in vehicle velocity, the spool 14 is slid downwardly to place the entrance port 54 in communication with the pressure adjusting chamber 70. Thus, the governor pressure $P_g$ of the exit port 58 increases. At this time, the following equations are satisfied when it is assumed that a pressure reception area of the governor pressure $P_g$ of the spool 14 is $A_1$, a pressure reception area of the governor pressure $P_g$ of the plunger 76 is $A_2$, and an upward pressing force which is exerted on the plunger 76 by the spring 80 is $F_p$.

$$F_w = P_g \cdot A_1 + F_p \qquad (4)$$

$$F_p = F_s - P_g \cdot A_2 \qquad (5)$$

As shown in the equations (4) and (5), the governor pressure $P_g$ from the pressure adjusting chamber 70 is fed back to the spring enclosing chamber 78 through the orifice 72. Resulting from the feedback governor hydraulic pressure $P_g$, a downward force acts on the plunger 76 via the pressure reception area $A_2$ and an upward force acts on the governor spool 14 via the pressure reception area $A_1$, respectively. Namely, as shown in the equation (4), acting along with the downward pressing force $F_w$ generated by the flyweights are resultant force ($P_g \cdot A_1$) generated by the feedback pressure $P_g$ received by the pressure reception area $A_1$ and the upward pressing force $F_p$ exerted on the plunger 76. The upward pressing force $F_p$ exerted on the plunger 76 is obtained by subtracting the force ($P_g \cdot A_2$) acting at the pressure reception area $A_2$ due to the feedback pressure $P_g$ from the force $F_s$ of the spring 80 as shown in equation (5).

Since the pressure reception area $A_1$ of the spool 14 and the pressure reception area $A_2$ of the plunger 76 are the same.

$$A_1 = A_2 \qquad (6)$$

then, at the breakpoint, since $$F_w = F_s \qquad (7)$$

the breakpoint hydraulic pressure $P_b$ at this time becomes $$P_b = P_g \qquad (8)$$

Namely, as shown in the equation (7), when the downward pressing force $F_w$ generated by the flyweights is equal to the upward pressing force $F_s$ generated by the spring 80, the pressures are balanced. At this time, the governor pressure $P_g$ is equal to the predetermined breakpoint pressure $P_b$.

When the governor speed N further increases, $$P_g \cdot A_2 > F_s \qquad (9)$$

$$F_p = 0 \qquad (10)$$

As shown in equation (9), since the feedback pressure at the pressure reception area $A_2$ is greater than the upward pressing force $F_s$ generated by the spring 80, the upward pressing force $F_p$ by the plunger 76 is set to $F_p = 0$ as is obvious from equation (5).

Furthermore, as will also be apparent from equation (14), when the upward pressing force $F_p$ exerted on plunger 76 is set to $F_p = 0$, $$F_w = P_g \cdot A_1 \qquad (11)$$

As shown in equation (11), the governor pressure $P_g$ increases with an increase in the downward pressing force $F_w$ generated by the flyweights. Thus, as shown in FIG. 4A, the governor pressure $P_g$ rises with an increase in governor speed N.

Figure 5:
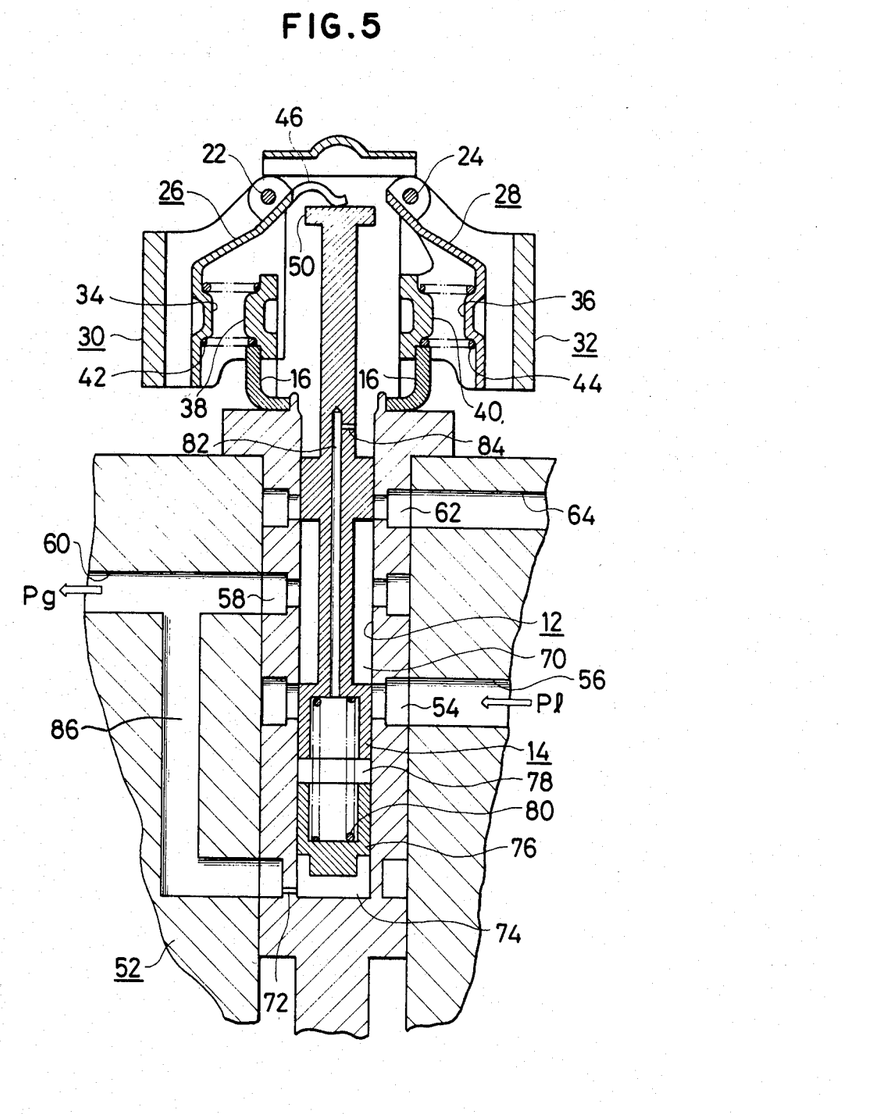
FIG. 5 is a cross sectional view showing a second embodiment of the invention.

FIG. 5 is a cross sectional view showing the second embodiment of the invention.

In the embodiment of FIG. 5, the spring enclosing chamber 78 is formed between the lower portion of the governor spool 14 and the plunger 76, thereby enclosing the spring 80 for establishing the breakpoint. The first communicating hole 82 is formed in the spool 14 in the axial direction in order to place the spring enclosing chamber 78 in communication with the outside. In the upper portion of the first communicating hole 82, a second communicating hole 84 is open to the outside and extends in a direction perpendicular to the hole 82. In addition, the feedback hydraulic pressure chamber 74 is formed between the plunger 76 and the bottom portion of the spool hole 12. The passageway 60 from the exit port 58 formed in the casing 52 is branched to provide a passageway 86. Some of the governor pressure $P_g$ is fed into the chamber 74 via the orifice 72.

The remaining structure is the same as that in the embodiment of FIG. 1.

According to the embodiment of FIG. 5, a predetermined breakpoint can also be set by forcing the spool 14 upwardly against the pressing force generated by the flyweights, via the spring 80.

On the other hand, the governor pressure in the pressure adjusting chamber 70 is fed to the chamber 74 through the passageway 86. Therefore, the mutual action created by the feedback hydraulic pressure and the hydraulic pressure of the pressure adjusting chamber 70 is set in a manner in which the pressure reception area at which the plunger 76 is forced upwardly is almost equal to the pressure reception area at which the governor spool 14 is forced downwardly. Accordingly, as shown in the equations (7) and (8), when the downward pressing force $F_w$ generated by the flyweights is substantially equal with the upward pressing force $F_s$ generated by the spring 80, the pressures are balanced. The governor pressure $P_g$ at this time is set to a value which is almost equal to the predetermined breakpoint pressure $P_b$.

Figures 6, 7, 8:
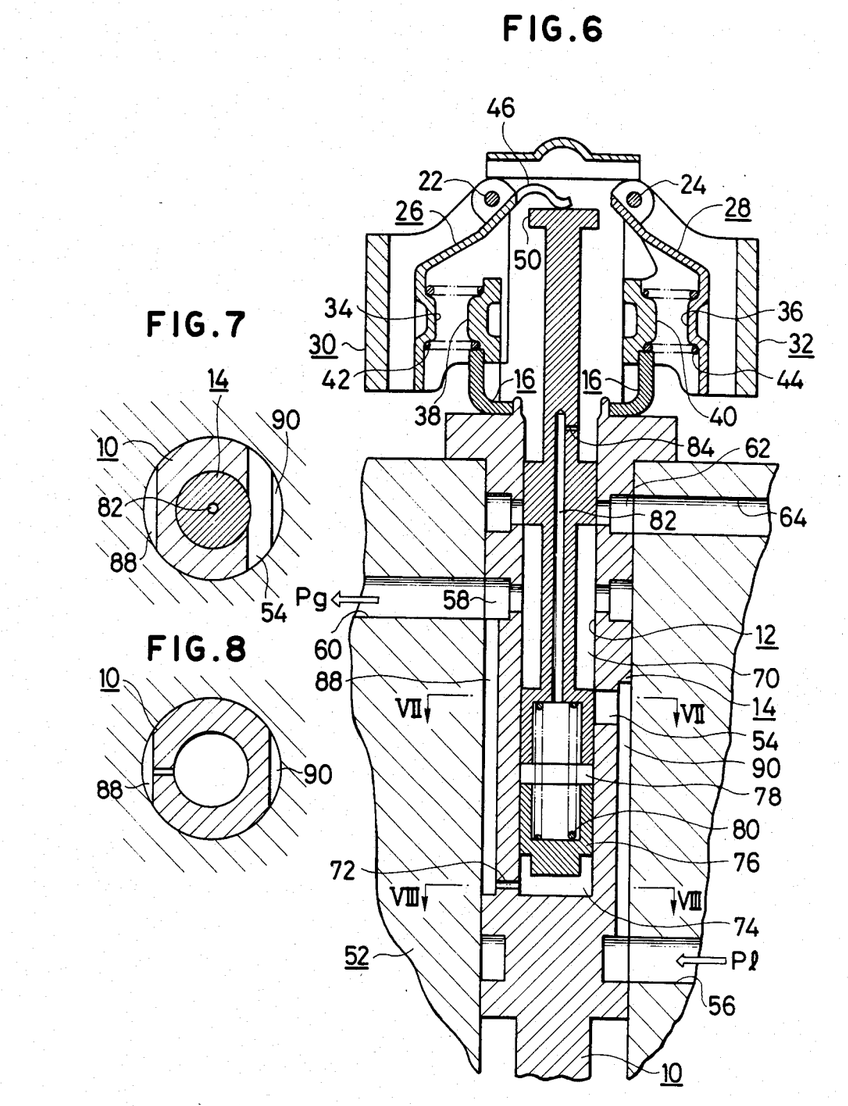
FIG. 6 is a cross sectional view showing a third embodiment of the invention.
FIG. 7 is a cross sectional view taken along the line VII—VII in FIG. 6.
FIG. 8 is a cross sectional view taken along the line VIII—VIII in FIG. 6.

FIG. 6 is a cross sectional view showing the third embodiment of the invention.

The embodiment of FIG. 6 is an improvement of the second embodiment shown in FIG. 5. Practically speaking, FIG. 7 is a cross sectional view taken along the line VII—VII in FIG. 6 and FIG. 8 is a cross sectional view taken along the line VIII—VIII in FIG. 6. As shown in FIGS. 7 and 8, a part of the outer peripheral portion of the sleeve 10 which is rotatably attached to the casing 52 is cut out, thereby forming a feedback passageway 88 communicating with the exit port 58. Some of the governor pressure from the exit port 58 is fed into the feedback hydraulic pressure chamber 74 through the feedback passage 88 and the orifice 72. On the other hand, a part of the sleeve 10 located on the opposite side of the sleeve 10 which faces the feedback passageway 88 is also cut out, thereby forming a passageway 90. The line pressure $P_l$ from the passageway 56 is supplied to the entrance port 54. Thus, the feedback passageway 86 in the embodiment of FIG. 5 does not need to be provided for the casing 52. In addition, portions of the outside of the sleeve 10 as cut out and the passageways 88 and 90 are formed, the lubricating oil can be supplied to the circumference of the sleeve 10, thereby enabling the rotational friction of the sleeve 10 to be reduced.

The remaining structure is the same as that of the second embodiment of FIG. 5.

Figures 9, 10:
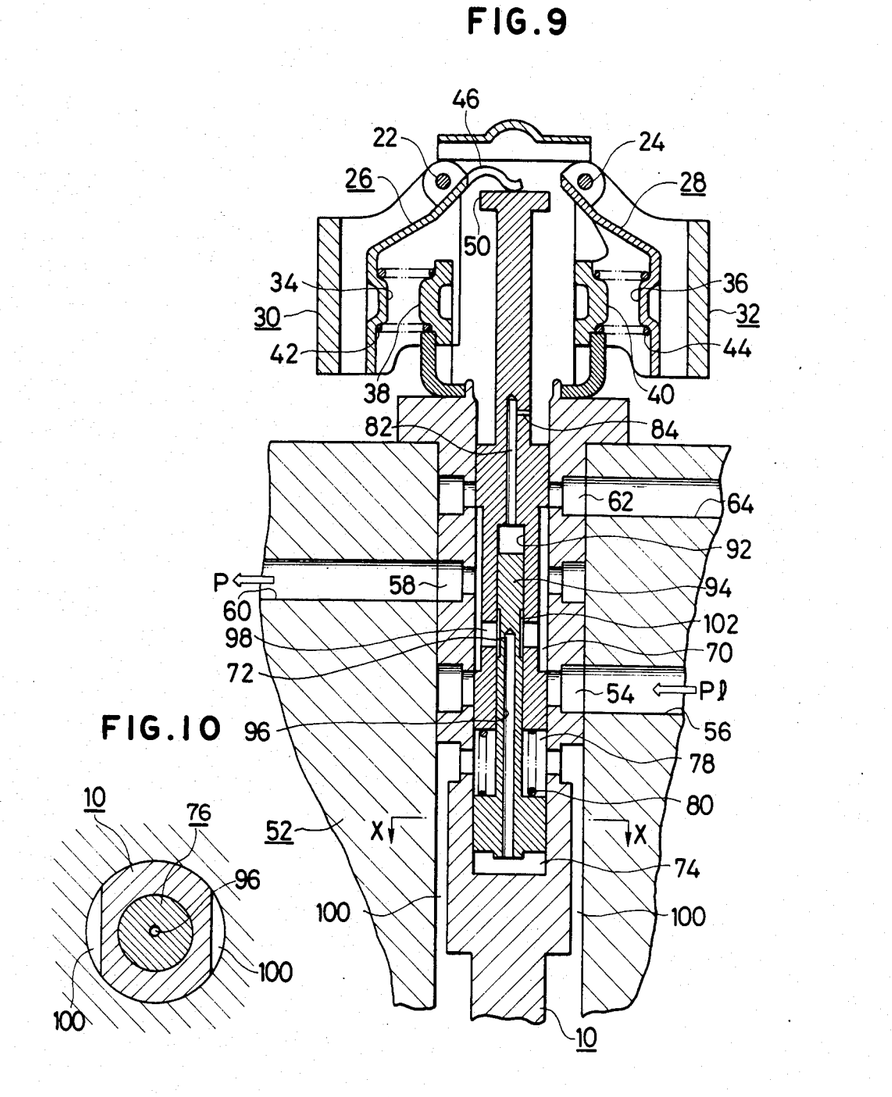
FIG. 9 is a cross sectional view showing a fourth embodiment of the invention.
FIG. 10 is a cross sectional view taken along the line X—X in FIG. 9.

FIG. 9 is a cross sectional view showing the fourth embodiment of the invention.

In the fourth embodiment, a plunger hole 92 which is open to the lower side is formed in the spool 14. A rod portion 94 which is formed integrally with the plunger 76 is slidably inserted into the plunger hole 92. Furthermore, the spring enclosing chamber 78 is defined between the rod portion 94 of the plunger 76 and the lower end portion of the spool 14. The spring 80 is disposed in the chamber 78.

The feedback hydraulic pressure chamber 74 formed in the lower end portion of the plunger 76 communicates with the pressue adjusting chamber 70 by a passageway 96, the orifice 72, and a passageway 98.

In this embodiment, a predetermined breakpoint can also be set by forcing the spool 14 upwardly against the downward pressing force generated by the flyweights, by the spring 80 disposed in the chamber 78.

On the other hand, the vent hole placing the chamber 78 in communication with the outside communicates with the outside via a passageway 100 which is formed by cutting out a part of the outer peripheral portion of the sleeve 10 as shown in FIG. 10, which illustrates a cross sectional view taken along the line X—X in FIG. 9.

In addition, since the rod portion 94 of the plunger 76 is slidably fitted into the plunger hole 92 formed in the spool 14, an oil groove 102 is formed by cutting out a part of the outer peripheral surface of the rod portion 94 which faces the passageway 98. The oil is supplied as a lubricating oil from the chamber 70 to the oil groove 102 through the passageway 98, thereby enabling the rod portion 94 to move smoothly. The other structure is the same as that of the third embodiment of FIG. 6.

As described above, according to the present invention, the switching operation of the shift valve can be certainly inhibited with certainty until the vehicle velocity reaches a predetermined velocity.

The spring enclosing chamber in which the spring is enclosed for establishing the breakpoint is formed separately from the feedback hydraulic pressure chamber and also communicates with the outside via the vent hole. Therefore, the breakpoint can be accurately determined by only the spring force.

Thus, the optimum desired breakpoint can be obtained by merely changing the load generated by the spring in accordance with the characteristics of the vehicle.

What is claimed is:

1. A governor for causing governor hydraulic pressure to be generated only after a rotational speed thereof reaches a predetermined breakpoint speed to hydraulically control an automatic transmission, said governor comprising:

a sleeve operatively connectable to the automatic transmission for being rotated by the output thereof, said sleeve having opposite ends, a sleeve hole extending therein and open to one of said ends, an entrance port communicable with a hydraulic pressure line through which hydraulic line pressure is supplied to the governor, and an exit port through which the governor hydraulic pressure is discharged when the breakpoint speed is reached during rotation of said sleeve by the automatic transmission;

a flyweight rotatably supported on said one of said ends of said sleeve, said flyweight being swung outwardly with respect to said one of the ends of said sleeve under centrifugal force as the rotational speed of said sleeve is increased;

a spool extending in an axial direction and slidably mounted to said sleeve in said spool hole, said spool operatively connected to said flyweight for being slid in said spool hole along said axial direction by said flyweight as said flyweight is swung outwardly once the breakpoint speed of said sleeve has been attained, and said spool having a pressure adjusting means for placing said entrance port in a degree of open communication with said exit port that corresponds to the amount said spool is slid in said spool hole;

a feedback hydraulic pressure chamber disposed in series with said spool along said axial direction thereof, said feedback hydraulic pressure chamber operatively connected to said exit port for allowing the governor hydraulic pressure to be fed thereto, and said feedback hydraulic pressure chamber in operative communication with said spool in a manner in which the governor hydraulic pressure fed thereto results in a force transmitted to the spool that acts on said spool in a second direction opposite to the direction in which the spool is slid by said flyweight;

a spring enclosing chamber disposed in series with said spool along said axial direction thereof, said spring enclosing chamber closed to said feedback hydraulic pressure chamber and open to the atmosphere outside the governor; and a spring enclosed in said spring enclosing chamber and operatively connected to said spool for exerting a preload on said spool in said second direction that establishes said breakpoint speed.

2. A governor as claimed in claim 1, and further comprising a plunger disposed in said spool hole, and wherein said feedback hydraulic pressure chamber is defined between said spool and said plunger, and said spring enclosing chamber is defined between said plunger and a surface defining the bottom of said spool hole.

3. A governor as claimed in claim 1, wherein a passageway and an orifice open to said passageway are in open communication with said exit port and said feedback hydraulic pressure chamber.

4. A governor as claimed in claim 1, and further comprising a plunger disposed in said spool hole, and wherein said spring enclosing chamber is defined between said spool and said plunger, and said feedback hydraulic pressure chamber is defined between said plunger and a surface defining the bottom of said spool hole.

5. A governor as claimed in claim 4, wherein a passageway is in open communication with said exit port and said feedback hydraulic pressure chamber, said passageway extending along an outer peripheral portion of said sleeve.

6. A governor as claimed in claim 5, wherein said spool has a respective passageway extending therein from said spring enclosing chamber to the atmosphere outside the governor for placing said spring enclosing chamber in open communication with the atmosphere outside the governor, said respective passageway including a first communicating hole extending along the axis of said spool toward said flyweight, and a second communicating hole open to said first communicating hole and the atmosphere and extending therebetween in a direction perpendicular to the direction along which said first communicating hole extends.

7. A governor as claimed in claim 1, and further comprising a plunger disposed in said spool hole, said plunger including a rod member, and wherein said spool has a rod hole extending therein open to the atmosphere outside of the governor, the rod member of said plunger extends in said rod hole, said spring enclosing chamber is defined between said plunger and an end portion of said spool, said feedback hydraulic pressure chamber is defined between said plunger and a surface defining the bottom of said spool hole, and a passageway extends in said rod member along a longitudinal axis thereof, said passageway operatively connected between said feedback hydraulic pressure chamber and said exit port for placing said feedback hydraulic pressure chamber in open communication with said exit port.

* * * * *